United States Patent Office 3,451,246
Patented June 24, 1969

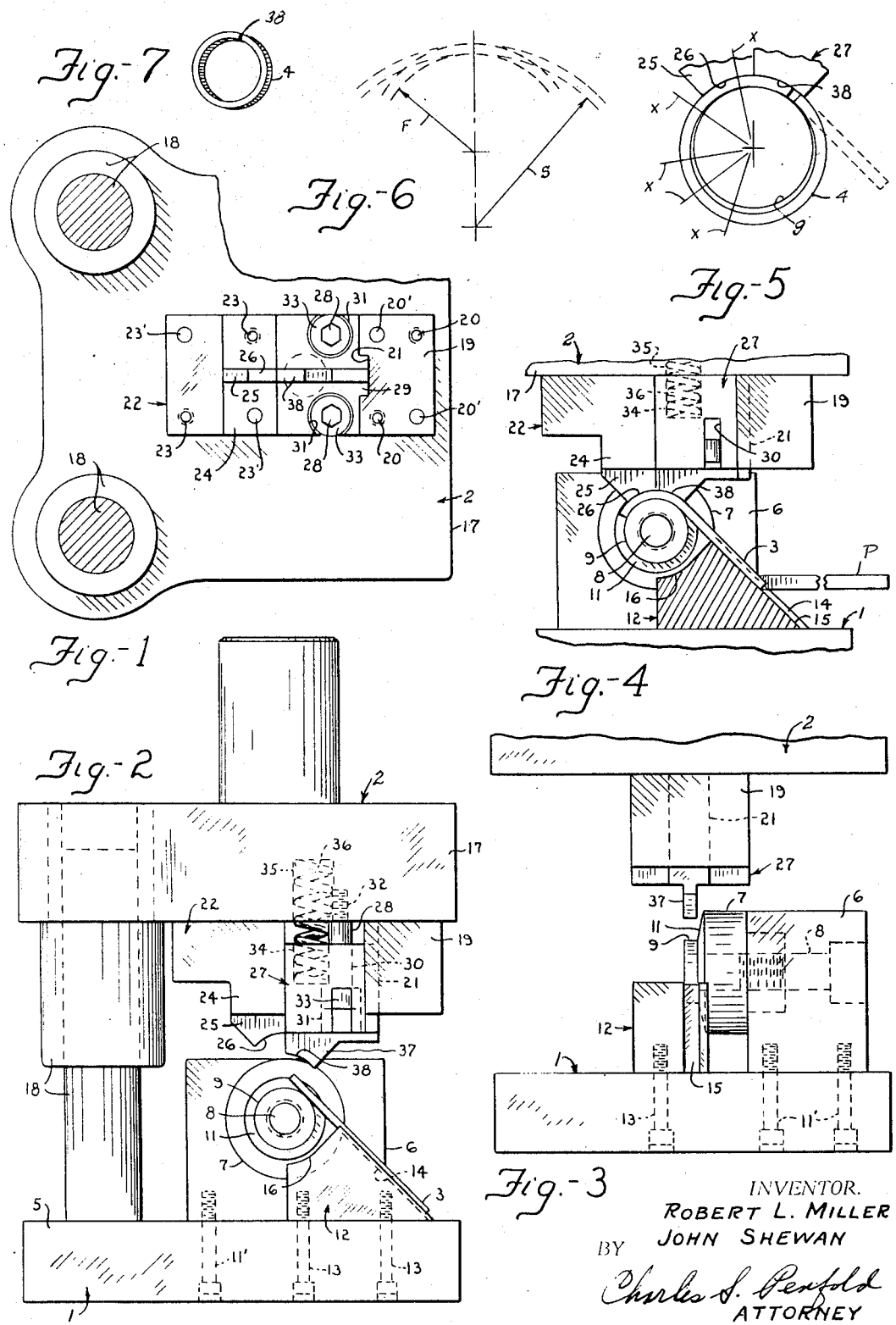

3,451,246
MACHINE AND METHOD FOR FORMING STRIP MATERIAL
Robert L. Miller, 808 N. Washington, and John Shewan, R.R. 7, both of Valparaiso, Ind. 46383
Filed Jan. 15, 1965, Ser. No. 425,740
Int. Cl. B21d 11/04
U.S. Cl. 72—304  12 Claims

ABSTRACT OF THE DISCLOSURE

The invention is primarily directed to a machine and/or method whereby a strip of metal may be successively overstressed from one end to the other between a pair of relatively movable mating dies to define a substantially true annulus.

---

The subject invention relates generally to the forming of materials and more particularly is directed to working or forming a strip of material, such as metal, into a substantially annular or cylindrical shape.

One of the important objects of the present invention is to provide a method and/or apparatus whereby a strip of material is formed into a substantially predetermined annular or cylindrical shape by utilizing relatively movable die elements which serve to successively overstress the material during its formation. Otherwise expressed, the material is deformed beyond its normal elastic limit during each forming movement of the die elements.

A significant objective of the invention is to provide a method and/or apparatus whereby a strip of material of predetermined length can be accurately formed into a substantially cylindrical shape while maintaining a uniform thickness thereof.

Another important object of the invention is to provide an apparatus comprised of a pair of opposed relatively movable die structures in which one of the structures is stationary and provided with a fixed die element having a cylindrical bearing surface and a fixed guide adjacent to the element whereby to facilitate introduction of a strip to be formed between the die structures, and the other of the die or punch structures is movable toward and away from the stationary die structure and provided with a pair of relatively movable die elements for respectively holding and conforming portions of the strip to the curvature of the cylindrical bearing surface of the fixed die element on the stationary die structure.

A specific object of the invention is to provide an apparatus of the character above described in which one of the die elements carried by the movable die structure is normally biased or urged in a direction toward the stationary die structure and primarily serves to engage and fixedly hold the strip while it is being formed by the other element which is fixed on the movable die structure.

Additional objects of the invention reside in offering advantages with respect to manufacture and assembly of the components of the respective die structures, efficiency in the operation of the apparatus, and uniformity in the resultant product.

In the drawings:

FIGURE 1 is a view of an underside of an upper movable die structure or punch, with portions shown in section;

FIGURE 2 is a side elevational view showing the upper die structure of FIGURE 1, including a lower stationary die structure, with the die structures disposed in positions to accommodate a strip to be formed;

FIGURE 3 is an end view of the structure shown in FIGURE 2 showing certain details of construction;

FIGURE 4 is a view similar to FIGURE 2, showing the upper die structure and relatively movable elements thereon in the act of forming a portion of a strip of material relative to a die element carried by the stationary die structure;

FIGURE 5 is a view showing, among other things, a step of finalizing the shape of the strip;

FIGURE 6 is a diagrammatic view showing the effects of overstressing of the strip during a forming operation; and FIGURE 7 is a perspective view showing the ends of the formed article united by welding.

Referring more particularly to the apparatus or machine illustrated in the drawings, numeral 1 generally designates a lower stationary die structure or unit and 2 an upper movable die structure or punch for forming or shaping a strip of material 3 into an annulus or cylinder 4.

The die structures are disposed in opposed relation for relative movement and the lower or stationary structure 1 includes a base or support 5 which carries a fixed member 6 provided with a cylindrical die element or horn 7 having a shaft 8 adjustably mounted on the member 6 so that any arcuate portion of a reduced cylindrical bearing surface 9 of the element may be presented for engagement by the strip.

The die element 7 is preferably provided with a tapered cylindrical surface 11 adjacent the bearing surface 9 whereby to assist in piloting or guiding the strip 3 onto the surface 9. The member 6 is preferably secured to the base or support 5 by a pair of screws 11' which extend upwardly through the base into threaded connection with the member, as shown in FIGURE 3.

A fitting, generally designated 12, is also carried by the support 5 and preferably secured thereto in a fixed relation to the die element 7 by a pair of screws 13, as shown in FIGURE 2, in a manner similar to that securing the member 6 in position. The fitting is preferably provided with an inclined groove 14 having a planar base surface 15 which is preferably disposed transverse to the longitudinal axis of the shaft 8 and substantially tangent to the bearing surface 9 so that when the strip is placed in the groove, which constitutes a guide means, and directed inwardly between the die structures the under surface of the strip will engage or bear against the surface 9 for support thereon as evidenced in FIGURE 2.

It will be noted that an upper portion of the fitting 12 is provided with a generally curved surface 16 which is located a sufficient distance from the cylindrical surface 9 so there is ample space between these surfaces to permit movement or formation of the strip about the cylindrical surface 9 without engaging the fitting.

The upper die structure 2 includes a support or head 17 which is mounted for vertical reciprocable movement in a plane toward and away from the stationary lower die structure 1, through the agency of a plurality of spaced conventional guides 18 which align and stabilize relative movement between the die structures when operated by driving means, not shown.

The support 17 of the upper die structure 2 is provided with a substantially rectangular block 19 which is preferably fixedly secured to the underside of the support by screws 20 and dowel 20', as illustrated in FIGURE 1. The block 19 is provided with a vertical recess 21. Another block or member substantially square in cross section, generally designated 22, is also preferably rigidly secured to the underside of the support by screws 23 and dowels 23'. The block 22 includes a lower portion 24 provided with a depending relatively narrow portion 25 which has an underarcuate surface 26 which, in combination with the cylindrical surface 9, serves to successively form the strip into the annulus as depicted in FIGURES 5 and 6.

A movable die element generally designated 27 is mounted on a pair of screws 28 for movement between the blocks 19 and 22 and has a rib 29 which slides in the recess 21 in the block 19 to guide and stabilize the movement of the element. The element 27 is provided with a pair of corresponding holes 30 which are counter-recessed at 31 as shown in FIGURES 1 and 2. The screws 28 have shanks disposed in the holes, reduced threaded portions 32 connected to the support 17 and annular heads 33 disposed in the counter-recesses 31 for limiting downward movement of the element. The element 27 is also provided with an upper cylindrical recess 34 slightly to the left of and between the counter-recesses 31 and the underside of the support 17 is provided with a similar recess 35 aligned with the recess 34. A helical spring 36 has its extremities disposed in the recesses 34 and 35 for normally urging the element downwardly, with the heads 33 of the screws 28 bottoming in the counter-recesses 31. The element 27 is further provided with a depending relatively narrow portion 37 which has a lower arcuate surface 38.

It will be observed that the thickness of the depending portion 37 of the element 27, the axial extent of the cylindrical surface 9 of the die element or horn 7, and the width of the inclined groove 14 in the fitting 12 are generally correlated whereby to assist in accommodating the strip as it is fed between the die structures. It will also be observed that the depending narrow die portions 25 and 37 are aligned in a close juxtaposed or engaging relationship and disposed substantially in the plane of the inclined groove 14 and cylindrical surface 9, as well as transverse to the axis of the shaft 8.

In view of the foregoing, it will be manifest that when the fore or inner extremity of the strip 3 of a predetermined length is placed in the groove or guide 14 and manually slid inwardly to the position shown in FIGURE 2 by a pusher tool such as the one designated P in FIGURE 4, and the upper die structure moves downwardly through the driving force of appropriate power means, the surface 38 on biased element 27, due to the normal extended position of this element, will first engage the free end portion of the strip which is located to the right of the axis of the shaft 8, as viewed in FIGURE 2, and resiliently conform it to an arcuate portion of the cylindrical surface 9 through the assistance of the force exerted by the spring 36, and then finally firmly clamp the strip in place when the element is bottomed against the underside of the support 17. After the fore end of the strip is formed or shaped through the aforementioned preliminary and final actions, and the upper die is retracted, the strip is then moved farther inward a predetermined distance so that the previously formed end portion of the strip is located beyond or to the left of the axis of the shaft, as shown in FIGURE 4, so that downward movement of the upper die structure will cause the arcuate surface 38 of the retractible element 27 to engage a second portion of the strip inset from said end portion and force it against an arcuate portion of the cylindrical surface 9 to resiliently clamp this second portion against the surface 9 while the first formed free end portion of the strip is being formed or overstressed through the action of the arcuate surface 26 of the fixed die element 22 which forces the strip against the surface 9 of the fixed element 7. In other words, the retractible die 27 primarily serves to effectively hold a portion of the strip firmly in engagement with the cylindrical surface 9 while the fixed element 22 is forming or shaping a portion of the strip about a portion of the surface 9. This retractible die also serves to initially form a free end portion of the strip as alluded to above and further acts first separately and then jointly with the arcuate surface 26 on the fixed die element 25 to successively conform portions of the strip to the curvature of the surface 9 as they are presented to the die elements to obtain an annulus or cylinder substantially as illustrated in FIGURE 5. Otherwise expressed, the relatively movable die elements 25 and 27 simultaneously act to shape the strip during at least one stage of the operation of the machine.

Attention is directed to the fact that the extent or amount of overstressing or shaping of the strip is dependent at least in some measure on the character or kind of metal or material employed, its cross-sectional dimensions and the diameter or size of the annulus to be obtained. In some instances, a material may slightly stretch during its formation but this depends on the structure of the material. The objective, among other things is to form an annulus having a substantially uniform wall thickness or one that is accurate as to all of its dimensions. The article or product illustrated in FIGURES 5 and 7 is the result of overstressing in which the radii of the arcs of pressure may be said to be less than radii of the arcs of the finished or resultant product. After the product is formed as shown, the ends are preferably brought together and welded or otherwise secured as indicated at 38 in FIGURE 7 to produce an annulus having a uniform diameter.

As exemplified in FIGURE 6, the letter F denotes the radius of the die surface 9 of the horn 7 and the letter S shows the spring back of the strip to a radius greater than that of the die surface 9. As depicted in FIGURE 5, the letter X denote approximate relative positions of the end of the strip at the completion of successive strokes of the die elements. It is to be understood that the arcuate extent or curved areas of the die elements may be varied as desired.

The feeding of the strip may be manually as through the agency of the pusher member P in FIGURE 4 or by any other means suitable for the purpose. For example, the feeding may be accomplished by a friction wheel, or the shape of the strip may be such that a power operated toothed wheel may be employed to regulate and feed the strip in timed relation to the relative movement between the die structures.

Having thus described our invention, it is obvious that various modifications may be made in the same without departing from the spirit of the invention, and, therefore, we do not wish to be understood as limiting ourselves to the exact forms, constructions, arrangements, and combinations of parts herein shown and described.

We claim:

1. In combination: a pair of opposed structures for forming a strip of material substantially into an annulus, one of said structures being provided with an arcuate bearing surface and the other of said structures being provided with a pair of relatively movable elements for forming the strip, and said structures being movable toward and away from one another whereby a strip may be fed between said structures for progressive conformation to said bearing surface by successively clamping and bending portions of the strip between said bearing surface and said elements.

2. In combination: a pair of opposed structures for forming a strip of material substantially into an annulus, one of said structures being provided with an arcuate bearing surface and the other of said structures being provided with a pair of relatively movable elements having arcuate surfaces, and said structures being movable toward and away from one another whereby portions of a strip can be successively clamped between the arcuate surface of one of said elements and said bearing surface, while the other arcuate surface of the other element engages and conforms the said portions successively against said bearing surface to progressively shape the strip substantially into an annulus.

3. In combination: a pair of opposed structures for forming a strip of material substantially into an annulus, one of said structures being provided with an element having a curved bearing surface, the other of said structures being provided with an impact surface and an element having a concave surface, said structures being movable toward and away from one another whereby a strip can be successively and progressively formed between said curved and concave surfaces while being progressively fed and clamped between said impact and bearing surfaces, said last-mentioned element being movable relative to said impact surface during formation of the strip.

4. The combination defined in claim 3, in which said impact surface is provided on a movable member carried by said other structure.

5. The combination defined in claim 3, in which said impact surface is provided on a member carried by said other structure, and said member is biased in a direction toward said first-mentioned structure.

6. In combination: a pair of opposed structures for forming a strip of material substantially into an annulus, one of said structures being provided with an arcuate bearing surface and the other of said structures being provided with a pair of relatively movable elements for forming the strip, and said structures being movable toward and away from one another whereby a strip may be fed between said structures for progressive conformation to said bearing surface by successively clamping and deforming portions of the strip substantially beyond its elastic limit between said bearing surface and said elements.

7. In combination: a pair of opposed structures for forming a strip of material substantially into an annulus, one of said structures being provided with an arcuate bearing surface and the other of said structures being provided with a pair of relatively movable elements having concave arcuate surfaces, and said structures being movable toward and away from one another whereby portions of a strip can be successively clamped between the arcuate surface of one of said elements and said bearing surface, while the other arcuate surface of the other element engages and conforms and overstresses the said portions successively against said bearing surface to progressively shape the strip substantially into an annulus.

8. In combination: a pair of opposed structures for forming a strip of material substantially into an annulus, one of said structures being provided with an element having an arcuate bearing surface, the other of said structures being provided with an impact surface and an element having an arcuate surface, said structures being movable toward and away from one another and said element being movable relative to said impact surface whereby portions of a strip can be successively and progressively overstressed by the said arcuate surfaces to substantially form an annulus while being progressively fed and clamped between said impact and bearing surfaces.

9. A method of forming a strip of material which comprises successively deforming portions thereof into arcuate shapes to substantially define a true annulus.

10. A method of forming a strip of material which comprises successively deforming portions thereof into arcuate shapes to substantially define an annulus having spaced arcuate ends, positioning the ends to effect engagement therebetween, and then uniting said ends.

11. A method of forming a strip of material which comprises successively overstressing portions thereof into arcuate shapes whereby to substantially define a true annulus.

12. A method of forming a strip of material which comprises successively overstressing portions thereof from one end to the other to define a formation in which the ends of the formation are arranged in a predetermined relationship.

References Cited

UNITED STATES PATENTS

| | | | |
|---|---|---|---|
| 1,664,619 | 4/1928 | Girard | 72—397 |
| 3,057,394 | 10/1962 | Vuillien | 72—412 |

RONALD D. GREFE, *Primary Examiner.*

U.S. Cl. X.R.

72—309, 397, 398, 403, 465